(12) United States Patent
Takahashi

(10) Patent No.: US 6,302,616 B1
(45) Date of Patent: Oct. 16, 2001

(54) ROTATION MECHANISM INCLUDING ROTATION SHAFT AND FIXED MEMBER WITH WELDING STRUCTURE, AND PRODUCING METHOD OF THE SAME

(75) Inventor: Seiya Takahashi, Urawa (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/388,256

(22) Filed: Sep. 1, 1999

(51) Int. Cl.$^7$ ................................................. F16L 13/00
(52) U.S. Cl. ...................... 403/271; 219/121.64; 411/171
(58) Field of Search ........................ 411/171; 403/52, 403/59, 65, 265, 267, 270, 271; 464/179; 219/121.64; 228/139

(56) References Cited

U.S. PATENT DOCUMENTS

| | | | |
|---|---|---|---|
| 1,330,241 | * 2/1920 | Cutter | 403/267 X |
| 2,509,020 | * 5/1950 | Stauffer et al. | 228/139 X |
| 2,563,107 | * 8/1951 | Fanger | 403/271 X |
| 4,669,471 | 6/1987 | Hayashi . | |
| 5,318,869 | * 6/1994 | Hashimoto et al. . | |
| 5,579,986 | * 12/1996 | Sherry et al. | 411/171 X |

FOREIGN PATENT DOCUMENTS 2-1498  1/1990 (JP) .

* cited by examiner

Primary Examiner—Lynne H. Brown
Assistant Examiner—Greg Binda
(74) Attorney, Agent, or Firm—Frishauf, Holtz, Goodman, Langer & Chick, P.C.

(57) ABSTRACT

A fixed member is fixed to a rotation shaft. The rotation member is rotatably fitted to the rotation shaft. In a state in which one of end surfaces of the rotation shaft abuts against one of side surfaces of the fixed member, the rotation shaft and the fixed member are welded and fixed to each other by high density energy beams radiated from a direction of the other side surface of the fixed member.

9 Claims, 3 Drawing Sheets

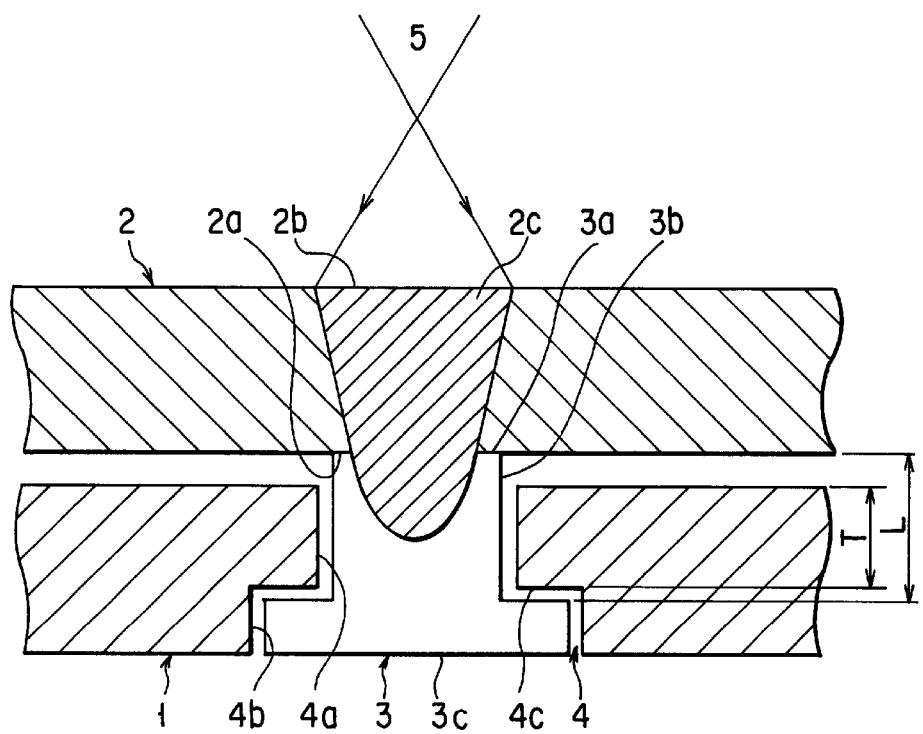
FIG. 1
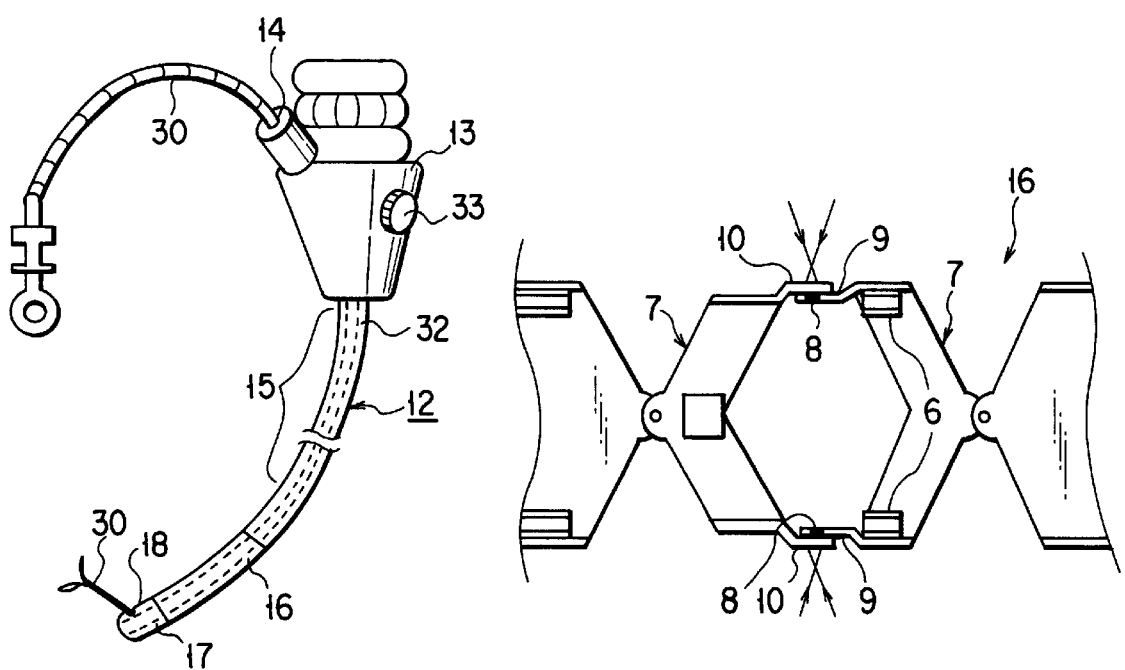
FIG. 2
FIG. 3

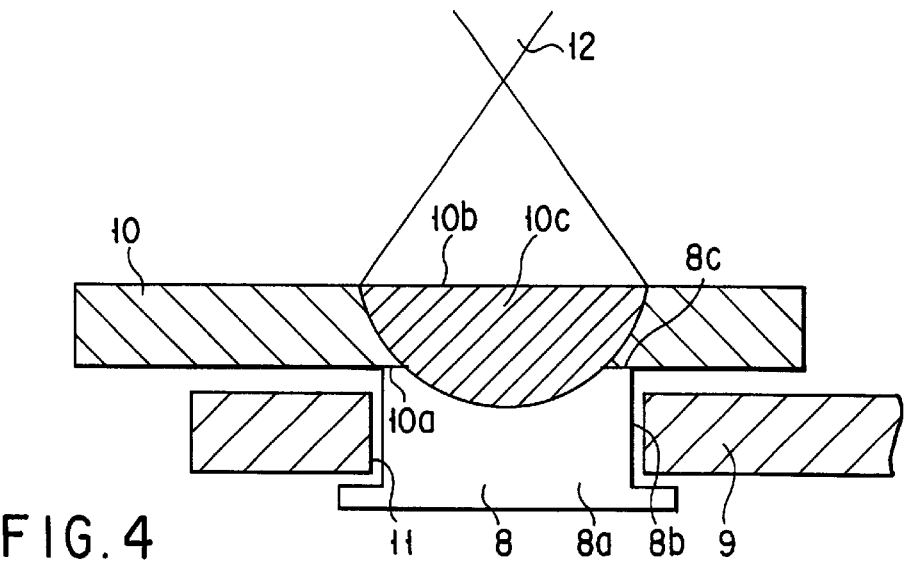
FIG. 4
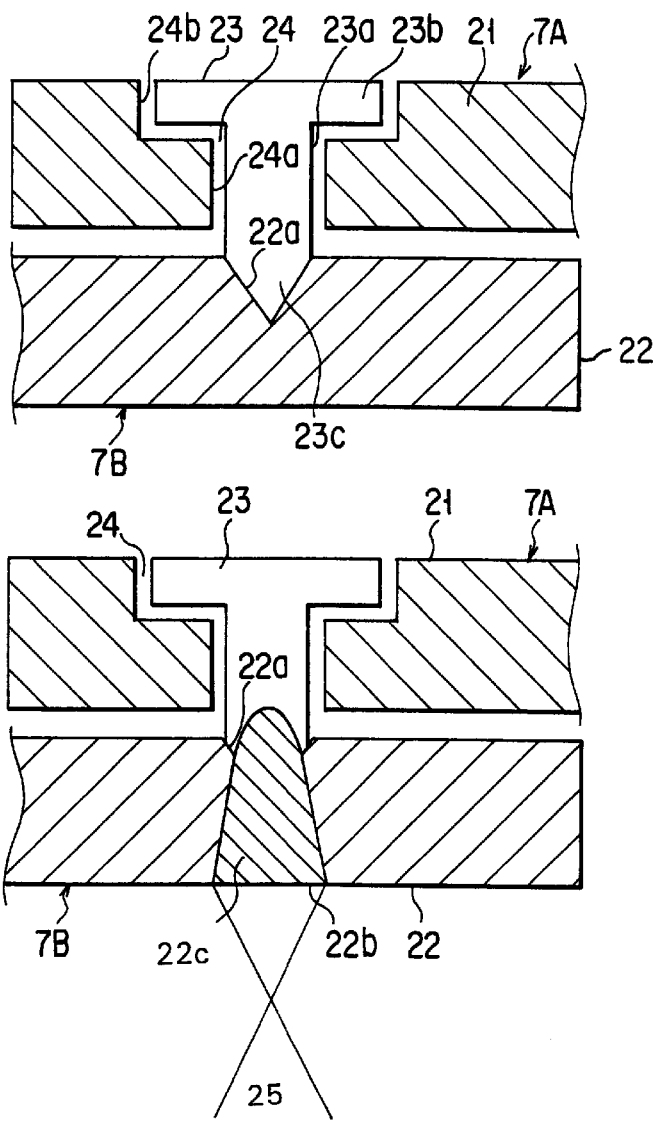
FIG. 5
FIG. 6

ROTATION MECHANISM INCLUDING ROTATION SHAFT AND FIXED MEMBER WITH WELDING STRUCTURE, AND PRODUCING METHOD OF THE SAME

BACKGROUND OF THE INVENTION

The present invention relates to a rotation mechanism and a producing method thereof, and more particularly, to a welding structure and a welding method of a rotation shaft and a fixed member.

Conventionally, as one example of the rotation mechanism and its producing method, Jpn. Pat. Appln. KOKOKU Publication No. 2-1498 discloses a technique concerning an endoscope nipper device.

This endoscope nipper device will be explained using FIGS. 7 and 8.

In FIG. 7, a connection piece 124 of a pair of nippers 119 is connected to a tip end 126a of a nipper operating wire 126 inserted through a flexible tube 121 through links 125 and a wire joint hardware 127.

A rear end (not shown) of the nipper operating wire 126 is connected to a nipper operating device (not shown) of a nipper operating portion.

By moving the nipper operating device backward and forward, the nipper operating wire 126 can be advanced and retreated in the flexible tube 121.

With the advancing and retreating movements of the nipper operating wire 126, the wire joint hardware 127 advances and retreats, so that the pair of nippers 119 can open and close around a pivot pin 130 fixed to a slotted opening cover 129 of a nipper head 123.

The pair of nippers 119 of the endoscope nipper device of the above structure have connection pieces 124 projected from connected portions 119a of both the nippers 119 are connected to links 125 through connection pins 131, the links 125 are connected to the operating wire 126 through the wire joint hardware 127, the connected portions 119a of both the nippers 119 pivot for opening and closing movements at the slotted opening cover 129 of the nipper head 123.

In the endoscope nipper device of the above structure, a connecting method, using laser welding, of the connection pieces 124 of the nippers 119, the links 125 and the connection pins 131 will be explained by using FIG. 8.

First, the links 125 abut against connected portions 124a of the connection pieces 124, connection holes 124b of the connection pieces 124 and connection holes 125a of the links 125 are aligned with each other, and connection pins 131 are inserted to the connection holes 124b and 125a.

Here, the length of each of the connection pins 131 is set to a value which does not exceed the sum L1 of a plate thickness of the connection piece 124 and a plate thickness of the link 125.

Flat heads 131a of the connection pins 131 are flush with a side of the links 125.

Further, weld ends 131b of the connection pins 131 are flush with a side of the connection pieces 124.

In this state, the weld ends 131b of the connection pins 131 are radiated with a laser light, and the weld portions 131b are welded along opening edges of the connection holes 124b of the connection pieces 124.

However, the above-described prior art has the following problems.

That is, when the connection pins 131 are inserted to the connection holes 124b and 125a, it is necessary to precisely position the three parts, i.e., the connection piece 124, the link 125 and the connection pin 131.

If the number of parts which need to be positioned is great, a control apparatus for an automatic welder is increased in size, which increases the costs.

Further, there are problems that the time required for the welding becomes long, and the efficiency of the automatic welder is lowered.

BRIEF SUMMARY OF THE INVENTION

In view of the conventional problems, it is an object of the present invention to provide a rotation mechanism in which the positioning operation by an automatic welder is easy, the operation efficiency is high, and the cost of a control apparatus of the automatic welder can be reduced.

Further, in view of the conventional problems, another object of the invention is to provide a producing method of a rotation mechanism capable of producing the rotation mechanism efficiently.

To achieve the above object, according to one aspect of the present invention, there is provided a rotation mechanism comprising:

a rotation shaft;

a fixed member fixed to the rotation shaft; and a rotation member rotatably fitted to the rotation shaft, wherein in a state in which one of end surfaces of the rotation shaft abuts against one of side-surfaces of the fixed member, the rotation shaft and the fixed member are welded and fixed to each other by high density energy beams radiated from a direction of the other side surface of the fixed member.

Further, according to another aspect, there is provided a producing method of a rotation mechanism comprising a rotation shaft, a fixed member fixed to the rotation shaft, and a rotation member rotatably fitted to the rotation shaft, the producing method comprising the steps of:

fitting the rotation shaft into a connection hole of the rotation member;

bringing one of end surfaces of the rotation shaft into abutment against one of side surfaces of the fixed member; and radiating high density energy beams from the other side surface of the fixed member, thereby welding the rotation shaft and the fixed member to each other.

According to the above-described invention, a melted portion formed on the fixed member generated by radiating high energy is allowed to reach the rotation shaft. Then, the radiation of the high energy is finished, thereby fixing the fixed member and the rotation shaft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the schematic structure of a rotation mechanism according to a first embodiment of the present invention;

FIG. 2 shows the schematic structure of an endoscope applied as a second embodiment of the invention;

FIG. 3 is a vertical sectional view showing a bendable portion constituting a bending portion of the endoscope shown in FIG. 2;

FIG. 4 is an enlarged sectional view showing an upper side of a connected portion between bending pieces of the endoscope shown in FIG. 2;

FIG. 5 is an enlarged sectional view showing a lower side of a connected portion between bending pieces of an endoscope applied as a third embodiment of the invention before welded;

FIG. 6 is an enlarged sectional view showing the lower side of the connected portion between the bending pieces of the endoscope applied as the third embodiment of the invention after welded;

DETAILED DESCRIPTION OF THE INVENTION

Figure 7:
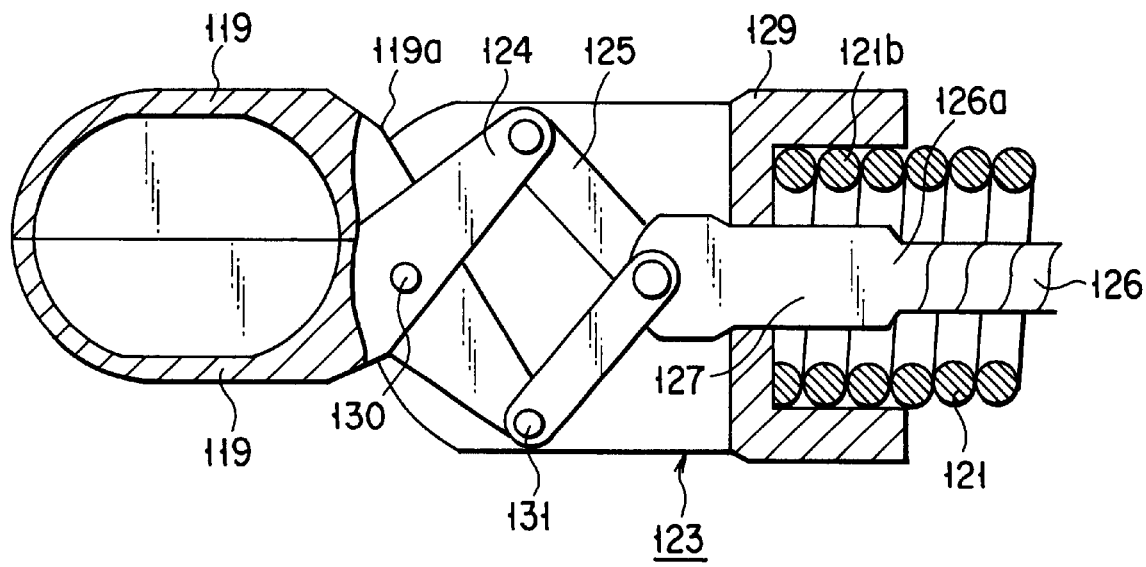
FIG. 7 is a partial sectional view showing a conventional endoscope nipper device.
Figure 8:
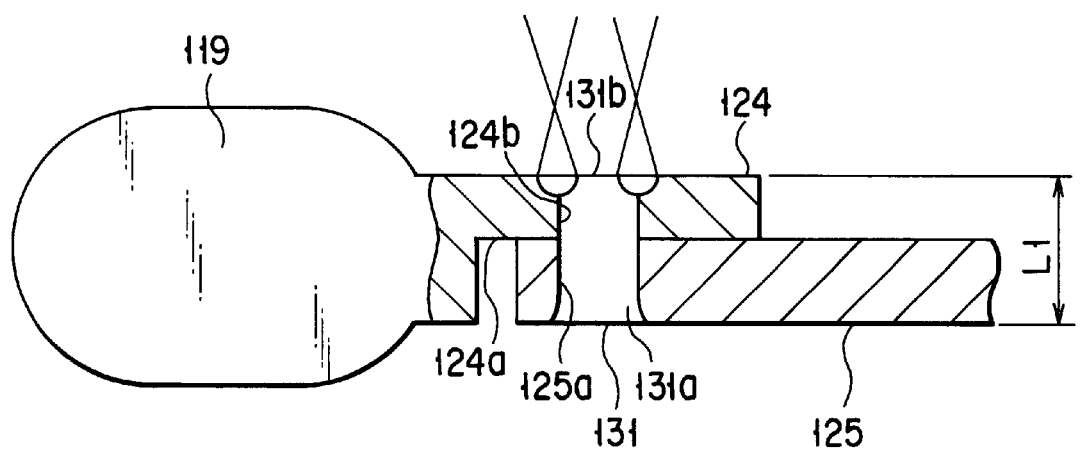
FIG. 8 is an explanatory view showing a welding method of a connected portion of the conventional endoscope nipper device.

Reference will now be made in detail to the presently preferred embodiments of the invention as illustrated in the accompanying drawings, in which like reference characters designate like or corresponding parts throughout the several drawings.

Embodiments of the invention will be explained below with reference to the drawings.

(First Embodiment)

FIG. 1 shows the schematic structure of a rotation mechanism according to a first embodiment of the invention.

In FIG. 1, the rotation mechanism comprises a rotation member 1 in which a connection hole 4 is formed, a connection pin 3 which is a rotation shaft rotatably fitted into the connection hole 4 of the rotation member 1, and a fixed member 2 welded to a tip end surface 3a of the connection pin 3.

A small diameter portion 4a of the connection hole 4 of this rotation member 1 is finished to have such a size that the rotation member 1 can smoothly rotate without rattling with respect to a shaft diameter 3b of the connection pin 3.

A large diameter portion 4b of the connection hole 4 of the rotation member 1 is formed larger than a diameter of a head 3c of the connection pin 3.

A length L of the connection pin 3 under its neck is set slightly longer than a thickness T of a spot faced surface 4c of the rotation member 1 so that a gap is formed in the thrust direction of the rotation member 1.

The connection pin 3 and the fixed member 2 are radiated with high density energy beams from a direction opposite from a joint surface 2a of the fixed member 2, thereby welding the end surface 3a of the connection pin 3 and the joint surface 2a of the fixed member 2. The joint surface 2a of the fixed member 2 which is welded to the end surface 3a of the connection pin 3 is a plane.

A producing method of the rotation member will be explained next.

First, in a state where the connection pin 3 is fitted into the connection hole 4 of the rotation member 1, the rotation member 1 and the connection pin 3 are placed on a jig which is not shown such that the head 3c of the connection pin 3 comes downward.

Next, the fixed member 2 is placed on the tip end surface 3a of the connection pin 3 such that the fixed member 2 is not inclined.

At that time, the position of the fixed member 2 is adjusted such that the connection pin 3 assumes a desired position.

In this state, the center of axis of the connection pin 3 is radiated with high density energy beams 5 from above.

A side 2b is radiated with the high density energy beams 5, and the temperature of the side 2b abruptly rises, and if the temperature exceeds the melting point of the side 2b, it is melted.

Since the radiation time of the high density energy beams 5 is short, the melted portion is immediately solidified as a melted shape 2c.

If the melted shape 2c is controlled such that it reaches the connection pin 3 but does not reach the rotation member 1 by appropriately selecting various conditions such as the output, the radiation time and the spot diameter of the high density energy beams to be radiated, the rotation member 1 and the fixed member 2 are rotatably connected to each other.

According to the first embodiment of the invention as described above, it is unnecessary to fit the fixed member 2 and the rotation member (shaft) 1 to each other, and they can be positioned easily.

Further, according to the first embodiment of the invention, since a member through which the connection pin need be inserted is only the rotation member 1, it is possible to enhance the insertion rate of the connection pin 3.

Furthermore, according to the first embodiment of the invention, since members which require precise positioning for inserting the connection pin 3 into the connection hole 4 are the rotation member 1 and the connection pin 3 only, it is possible to reduce the cost of the control apparatus of the automatic welder for positioning.

(Second Embodiment)

FIGS. 2 to 4 show a second embodiment of the invention.

FIG. 2 shows the schematic structure of an endoscope applied as the second embodiment of the invention.

FIG. 3 is a vertical sectional view showing a bendable portion constituting a bending portion of the endoscope shown in FIG. 2.

FIG. 4 is an enlarged sectional view showing an upper side of a connected portion between bending pieces of the endoscope shown in FIG. 2.

In FIG. 2, an endoscope 12 mainly comprises an operating portion 13, a flexible connected portion 15, and a tip end 17 in which an object lens or the like is embedded.

A bendable portion 16 which is bendable by remote control is formed between the connected portion 15 and the tip end 17.

The bendable portion 16 comprised a plurality of bending pieces 7 (see FIG. 3) rotatably connected to each other through connection pins 8 (see FIG. 3), and resilient materials such as rubber tube cover around the connected portions. The basic structure of the bendable portion 16 is known.

A tip end of a bendable portion operating wire 32 is fixed to the leading end side of bending piece 7 (see FIG. 3) or the tip end 17.

The bendable portion operating wire 32 passes through the bendable portion 16 and is pulled out rearward, and is connected to a known bendable portion operating mechanism in the operating portion 13.

In FIG. 2, the reference character 33 represents a bendable portion operating knob for pulling a bendable portion operating wire 32.

The bendable portion operating wire 32 is pulled by rotating the bendable portion operating knob 33.

The bendable portion 16 is bent in a direction pulled by the bendable portion operating wire 32.

In FIG. 2, the reference character 30 represents an endoscope nipper device which is the same as that explained as a prior art, and is inserted between a nipper entrance 14 and a nipper exit 18.

In FIG. 3, the bendable portion 16 has the structure in which wire receiving members 6 are fixed to inner sides of the bending pieces 7, and the bending pieces 7 are connected to each other through the connection pins 8 which are rotation shafts, thereby constituting the rotation mechanism.

An inner diameter of the bending piece 7 is formed to be 10 mm, and an inner diameter of the wire receiving member 6 is formed to be 1 mm.

The bending piece 7 is formed of stainless steel tube material (SUS304). Portions of peripheral walls of both ends of the bending piece 7 are projected in axial direction of the bendable portion to form a pair of semicircular connecting portion 9 (rotation members) such that the connecting portions 9 are opposed to each other.

In correspondence with the pair of connecting portions 9, peripheral walls of both end of adjacent bending piece 7 are also projected into a pair of connecting portions 10 (fixed members).

These connecting portions 9 and 10 are formed such as to be superposed on each other in plane.

As shown in FIG. 4, of the superposed connecting portions 9 and 10, only the inner connecting portion 9 is formed with connection hole 11, and the outer connecting portion 10 is not formed with a connection hole.

The thickness of each of the connecting portions 9 and 10 is 0.8 mm.

A connection pin 8 rotatably fitted in the connection hole 11 of the connecting portion 9 is made of SUS304, a diameter of its shaft portion 8b is 0.35 mm, and a length thereof under its neck is 0.15 mm.

A diameter of a head 8a of the connection pin 8 is formed greater than that of the connection hole 11.

A tip end 8c of the connection pin 8 is welded to an inner surface 10a of the connecting portion 10.

With this design, the bending pieces 7 are rotatably connected to each other, and the function as the bendable portion 16 can be kept.

Next, a producing method of the connected portions of the bending pieces 7 which are the rotation mechanism of the above structure will be explained.

First, the connection pin 8 is inserted into the connection hole 11 of the connecting portion 9 from inside of the bending piece 7, and the tip end 8c of the connection pin 8 is brought into abutment against the inner surface 10a of the connecting portion 10.

In this state, an energy radiating portion 10b of the connecting portion 10 which aligns with the tip end 8c of the connection pin 8 is radiated with YAG laser beams 12 as the high density energy beams (output of 0.7 to 0.8 j, spot diameter of 0.3 to 0.4 mm, pulse width of 6.0 to 8.0 msec).

Upon radiation, a melted portion 10c is formed from the energy radiating portion 10b toward the tip end 8c of the connection pin 8.

This melted portion 10c reaches the connection pin 8.

After the melted portion 10c reaches the connection pin 8, if the radiation of the YAG laser beams 12 is finished, the melted portion 10c is solidified, and the connecting portion 10 and the connection pin 8 are fixed to each other.

Accordingly, the bending pieces 7 are rotatably connected to each other.

According to the above-described second embodiment of the invention, since it is unnecessary to fit one of the connecting portions 9 to the connection pin 8, the positioning operation is easy, and the efficiency of the welding operation can be enhanced.

Further, according to the second embodiment of the invention, since a member through which the connection pin 8 need be inserted is only the other connecting portion 10, it is possible to enhance the insertion rate of the connection pin 8.

Furthermore, according to the second embodiment of the invention, since members which require precise positioning for inserting the connection pin 8 into the connection hole 11 are the other connecting portion 10 and the connection pin 8 only, it is possible to reduce the cost of the control apparatus of the automatic welder for positioning.

Furthermore, according to the second embodiment of the invention, since the one connecting portion 9 and the connection pin 8 can be welded at free positions, it is possible to produce a bendable portion having different connecting positions between the same members.

Although the YAG laser is used as the high density energy beams for the welding means in the second embodiment of the invention, the same effect can be obtained using electron beams.

Although the bendable portion of the endoscope is taken as an example in the second embodiment of the invention, the same effect can be obtained even if the present invention is applied to the endoscope nipper device shown as the prior art.

(Third Embodiment)

FIGS. 5 and 6 show a third embodiment of the invention.

FIG. 5 is an enlarged sectional view showing a lower side of a connected portion between bending pieces before welded.

FIG. 6 is an enlarged sectional view showing the lower side of the connected portion between the bending pieces after welded.

Since the basic structure of the third embodiment of the invention is substantially the same as that of the above-described second embodiment, only the differences are indicated, and explanation of the same portions are omitted.

In FIG. 5, a connecting portion 21 projects from a bending piece 7A which is a rotation member.

This connecting portion 21 is formed with a connection hole 24.

The connection hole 24 comprises a through hole 24a in which a shaft portion 23a of a connection pin 23 rotates, and a spot faced portion 24b in which a head 23b of the connection pin 23 is accommodated.

The connection pin 23 is rotatably fitted in the connection hole 24 of the connecting portion 21.

The connection pin 23 comprises the shaft portion 23a, the head 23b and a conical tip end 23c.

A connecting portion 22 projects from a bending piece 7B which is a fixed member.

A conical recess 22a is formed in the connecting portion 22.

The tip end 23c of the connection pin 23 abuts against the recess 22a of the connecting portion 22.

As shown in FIG. 6, the connecting portion 22 and the connection 23 are welded by YAG laser beams 25, and connected by a melted portion 22c.

With this, the bending pieces 7A and 7B are rotatably connected to each other, and the function as the bendable portion 16 can be kept.

A producing method of the connected portions of the bending pieces which are the rotation mechanism of the above structure will be explained.

First, as shown in FIG. 5, the connection pin 23 is inserted into the connection hole 24 of the connecting portion 21 from inside of the bending piece 7A, and the tip end 23a of the connection pin 23 is brought into abutment against the recess 22a of the connecting portion 22.

Here, if the tip end 23c of the connection pin 23 is brought into abutment against a portion within the recess 22a of the connecting portion, the tip end 23c of the connection pin 23 moves along the slope of the recess 22a, thereby positioning to a predetermined position.

Therefore, it is unnecessary precisely positioning between bending pieces and can be easy positioned in comparison with in a case of inserting the connection pin into a hole provided to the recess.

In this state, as shown in FIG. 6, an energy radiating portion 22b of the connecting portion 22 which aligns with the tip end 23c of the connection pin 23 is radiated with YAG laser beams 24 as the high density energy beams, so that the melted portion 22c is formed, and the connection pin 23 and the connecting portion 22 are welded to each other.

With this, the bending pieces 7A and 7B are rotatably connected to each other.

According to the above-described third embodiment of the invention, since it is unnecessary to fit one of the connecting portions 22 to the connection pin 23, the positioning operation is easy, and the efficiency of the welding operation can be enhanced.

Further, according to the third embodiment of the invention, since a member through which the connection pin 23 need be inserted is only the other connecting portion 21, it is possible to enhance the insertion rate of the connection pin 23.

Furthermore, according to the third embodiment of the invention, since members which require precise positioning for inserting the connection pin 23 into the connection hole 24 are the other connecting portion 21 and the connection pin 23 only, it is possible to reduce the cost of the control apparatus of the automatic welder for positioning.

Furthermore, according to the third embodiment of the invention, since the one connecting portion 22 is formed with the conical recess 22a and the tip end 23c of the connection pin 23 is positioned along the recess, the positioning operation is carried out precisely.

In the third embodiment of the invention also, the above-described modifications of the second embodiment can be applied, and the same effect can be obtained.

Therefore, it is unnecessary to fit the fixed member and the rotation shaft which constitute the rotation mechanism to each other, and the positioning operation is easy and therefore, the efficiency of the welding operation can be enhanced.

Further, according to the present invention, since members which require precise positioning for inserting the rotation shaft into the connection hole are the rotation member and the rotation shaft only, it is possible to reduce the cost of the control apparatus of the automatic welder for positioning.

Furthermore, according to the present invention, since it is easy to position the fixed member and the rotation shaft which constitute the rotation mechanism, it is possible to produce the rotation mechanism efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotation mechanism comprising:

a rotation shaft;

a fixed member fixed to the rotation shaft; and a rotation member rotatably fitted to the rotation shaft with the rotation shaft fitted in a connection hole formed in the rotation member, wherein in a state in which one of end surfaces of the rotation shaft abuts against one of side surfaces of the fixed member, the rotation shaft and the fixed member are welded and fixed to each other by high density energy beams radiated from a direction of the other side surface of the fixed member, wherein the rotation shaft comprises a connection pin rotatably fitted to the connection hole formed in the rotation member, the fixed member is welded to a tip end surface of the connection pin, the connection hole of the rotation member comprises a spot faced surface having a small diameter portion and a large diameter portion, the small diameter portion is finished into such a size that the small diameter portion smoothly rotates without rattling with respect to a shaft diameter of the connection pin, and the large diameter portion is formed greater than a diameter of a head of the connection pin.

2. A rotation mechanism according to claim 1, wherein a length of the connection pin under its neck is set slightly longer than a thickness of the spot faced surface of the rotation member, thereby forming a gap in a thrust direction of the rotation member.

3. A rotation mechanism according to claim 1, wherein the side surface of the fixed member abutting the one end surface of the rotation shaft is a plane.

4. A rotation mechanism according to claim 1, wherein the rotation mechanism comprises bending pieces each having a wire receiving member fixed to an inner side of each of the bending pieces, the bending pieces are rotatably connected to each other through a connection pin, the rotation mechanism is a bendable portion which is bendable by remote control.

5. A rotation mechanism comprising:

a rotation shaft;

a fixed member fixed to the rotation shaft; and a rotation member rotatably fitted to the rotation shaft with the rotation shaft fitted in a connection hole formed in the rotation member, wherein in a state in which one of end surfaces of the rotation shaft abuts against one of side surfaces of the fixed member, the rotation shaft and the fixed member are welded and fixed to each other by high density energy beams radiated from a direction of the other side surface of the fixed member, wherein the rotation mechanism comprises bending pieces each having a wire receiving member fixed to an inner side of each of the bending pieces, the bending pieces are rotatably connected to each other through a connection pin, the rotation mechanism is a bendable portion which is bendable by remote control, portions of peripheral walls of one of the bending pieces project in an axial direction of the bendable portion to form a first pair of semicircular connecting portions which are opposed to each other, a second pair of semicircular connecting portions project as fixed members from peripheral walls of another of the bending pieces which is adjacent the one of the bending pieces, the second pair of semicircular connecting portions project in correspondence with positions of the first pair of semicircular connecting portions, portions of the first and second pair of semicircular connecting portions are formed such that they are superposed on each other in a plane, the connection hole is formed only in an inner one of the superposed first and second pair of semicircular connecting portions, the connection pin being rotatably fitted to the connection hole as the rotation shaft, a diameter of a head of the connection pin is greater than a diameter of the connection hole, and a tip end of the connection pin is welded to an inner side surface of the second pair of semicircular connecting portions so that the bending pieces are rotatably connected to each other to keep a function as a bendable portion.

6. A rotation mechanism comprising:

a rotation shaft;

a fixed member fixed to the rotation shaft; and a rotation member rotatably fitted to the rotation shaft with the rotation shaft fitted in a connection hole formed in the rotation member, wherein in a state in which one of end surfaces of the rotation shaft abuts against one of side surfaces of the fixed member, the rotation shaft and the fixed member are welded and fixed to each other by high density energy beams radiated from a direction of the other side surface of the fixed member, wherein the rotation mechanism comprises bending pieces each having a wire receiving member fixed to an inner side of each of the bending pieces, the bending pieces are rotatably connected to each other through a connection pin, the rotation mechanism is a bendable portion which is bendable by remote control, the connection pin comprises a shaft portion, a head and a conical tip end, the connection hole is formed in a bending piece which is the rotation member, the connection hole comprises a through hole in which the shaft portion of the connection pin rotates, and a spot faced surface in which the head of the connection pin is accommodated, the connection pin is rotatably fitted, and the conical tip end of the connection pin is brought into abutment against and welded to surfaces of a conical recess formed in the bending piece which is the fixed member so that the bending pieces are rotatably connected to each other to keep a function as a bendable portion.

7. A producing method of a rotation mechanism comprising a rotation shaft, a fixed member fixed to the rotation shaft, and a rotation member rotatably fitted to the rotation shaft, the producing method comprising the steps of:

fitting the rotation shaft into a connection hole of the rotation member;

bringing one of end surfaces of the rotation shaft into abutment against one of side surfaces of the fixed member; and radiating high density energy beams from the other side surface of the fixed member, thereby welding the rotation shaft and the fixed member to each other.

8. A producing method of a rotation mechanism according to claim 7, wherein the high density energy beams are YAG laser beams.

9. A producing method of a rotation mechanism according to claim 8, wherein the YAG laser beams include output of 0.7 to 0.8 j, spot diameter of 0.3 to 0.4 mm, and pulse width of 6.0 to 8.0 msec.

* * * * *